INVENTOR
WINSTON T. DUERDOTH,
BY Hall & Houghton
ATTORNEY

INVENTOR
WINSTON T. DUERDOTH,
BY Hall & Houghton
ATTORNEY

Sept. 12, 1967 W. T. DUERDOTH 3,341,660

TIME DIVISION MULTIPLEX PULSE CODE MODULATION COMMUNICATION SYSTEMS

Filed Jan. 14, 1964 6 Sheets-Sheet 3

INVENTOR
WINSTON T. DUERDOTH
BY Hall & Houghton
ATTORNEY

INVENTOR
WINSTON T. DUERDOTH,
BY Hall & Houghton
ATTORNEY

INVENTOR
WINSTON T. DUERDOTH,
BY Hall & Houghton
ATTORNEY

Sept. 12, 1967 W. T. DUERDOTH 3,341,660

TIME DIVISION MULTIPLEX PULSE CODE MODULATION COMMUNICATION SYSTEMS

Filed Jan. 14, 1964

6 Sheets-Sheet 6

INVENTOR
WINSTON T. DUERDOTH,
BY Hall & Houghton
ATTORNEY

United States Patent Office 3,341,660

Patented Sept. 12, 1967

3,341,660

TIME DIVISION MULTIPLEX PULSE CODE MODULATION COMMUNICATION SYSTEMS

Winston Theodore Duerdoth, Ruislip, England, assignor to Her Majesty's Postmaster General, London, England Filed Jan. 14, 1964, Ser. No. 337,623
Claims priority, application Great Britain, Jan. 14, 1963, 1,664/63
8 Claims. (Cl. 179—15)

Figure 1:
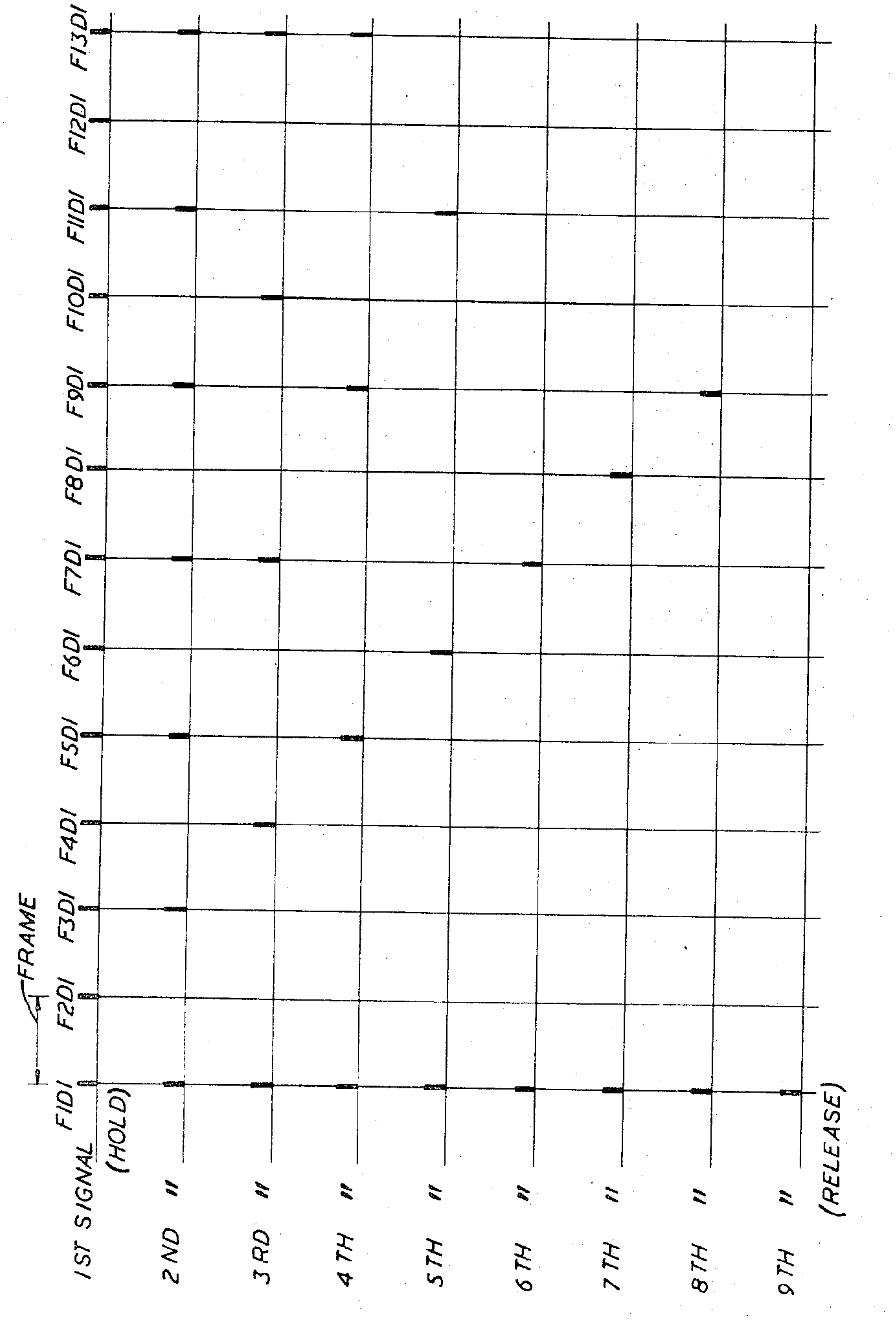

This invention relates to time division multiplex multichannel pulse code modulation (P.C.M.) communication systems and to apparatus for the transmission, reception and detection of signalling information, as distinct from speech, in such transmission systems and in particular it relates to the signalling of information in P.C.M. telecommunication transmission exchange systems, although its use is by no means restricted to such systems.

A requirement of P.C.M. multichannel telecommunication transmission exchange systems is that any one of a number of incoming channels of the system must be switchable to any one of a number of outgoing channels, but, as in general, the incoming and outgoing channels are not in time coincidence, storage and switching of the channel information is necessary.

In telephone systems employing pulse code modulation techniques high speed pulses representative of the speech signals are transmitted. This is achieved by sampling the speech signal amplitudes at a frequency equal to at least twice the highest speech frequency to be transmitted, the instantaneous amplitudes thus determined being transmitted in code as digits of a binary system. The number of binary digits per code determines the number of amplitude quantized levels in the sample, an $n$-digit binary code allowing $2^n$ quantizing levels, a 3-digit code giving 8 levels, while a 7-digit code gives 128 levels.

One particular digit of the binary code may be reserved for signalling information, as distinct from speech, this digit being in the same time position in all channels. For example, when a call is originated in a particular channel, a pulse is applied in the signalling digit position, say the first digit of that channel. Thus, if the call is originated in channel 1, the signal will appear in digit 1 position of channel 1 in each frame which is one cycle of the time positions of all channels. This signal is detected at the exchange and causes a signal to be returned to the source indicating that the exchange is ready to receive information. The pulse will constitute a hold signal, so that its absence for a specified persistence period, will cause release of the connection. After such a signal has been detected at the exchange and a signal returned to the source, it is necessary for the source to pass information to the exchange in order to control the setting-up of the connection and if required for this operation the other digit positions of the channel are available for sending information. Once the connection has been established however, the other digit positions are required for speech and only the first digit position which is providing the hold condition is available for any further signalling requirements.

Since the presence of this digit provides the hold condition, and its absence for the specified period denotes release, a method of obtaining other signals is to use the absence of this digit for limited periods less than the specified period to indicate different conditions, and in this way several different signalling conditions can be obtained. This method of signalling is limited however, in that, in a P.C.M. system, one channel in each frame is reserved for synchronisation, the information contained in this channel applying to all of the other channels in the frame, so that the presence of a signal in a channel must, of necessity, always have the same meaning.

That method is not readily applicable to systems in which switching is required, and which for various reasons, involve switching a channel of one frame to a channel of a different frame. For instance, the channels incoming to a switching exchange may originate from different sources and suffer different delays in transmission, and unless all the delays are equalised so that the synchronisation signal is made applicable to all channels of a frame, the identity of a particular signal will be lost. If, at a switching exchange, these delays are equalised so that the incoming channels are made time coincident with the outgoing channels, it is possible to switch earlier channels in an incoming frame into later channels in the coincident outgoing frame, but it is impossible to switch later channels in an incoming frame into earlier channels in the coincident outgoing frame, making it necessary for the incoming channel to be delayed, for the requisite number of frames so that it can be switched at the next coincidence. Equalisation and provision of delay is not economically practical and the method just mentioned of providing several signals is not suitable.

It is an object of the present invention to provide a plurality of different signalling conditions without the limitation that no channel in a frame can contain more than one signalling condition.

According to the present invention in a multichannel pulse code modulation time division multiplex communication system, one digit position of each channel is allotted for the transmission of signalling information relating to the channel and different types of signalling information are represented by the time interval between one appearance of a pulse in the one digit position and the next position of a pulse in that position.

The system includes a transmitter of signalling information having means for sending a pulse in the one digit position and subsequently suppressing any further transmission in that position until the expiry of a time interval indicative of the type of signalling information to be sent.

The transmitter may include a control unit having a plurality of output leads each representing a different type of signalling information. To transmit a particular type of information, the transmitter causes a train of pulses to appear on the lead representing that type coincident with the one digit position. The transmission from the transmitter of all pulses of the pulse train other than those separated by the time interval representing the type of signalling information being inhibited. The output leads may be joined to a pulse storage system which stores a pulse of the train for a period depending upon the time interval, transmission of the pulse being inhibited during storage.

The receiver of the system includes a circuit for gating into a receiving circuit pulses appearing at the time of the one digit position, pulses so gated initiating storage of the pulse and the production of an output on coincidence between the stored pulse and the next succeeding gated pulse following that which initiated storage. The receiving circuit may also include means for withholding the output until a required number of coincidences have been counted.

Figure 2:
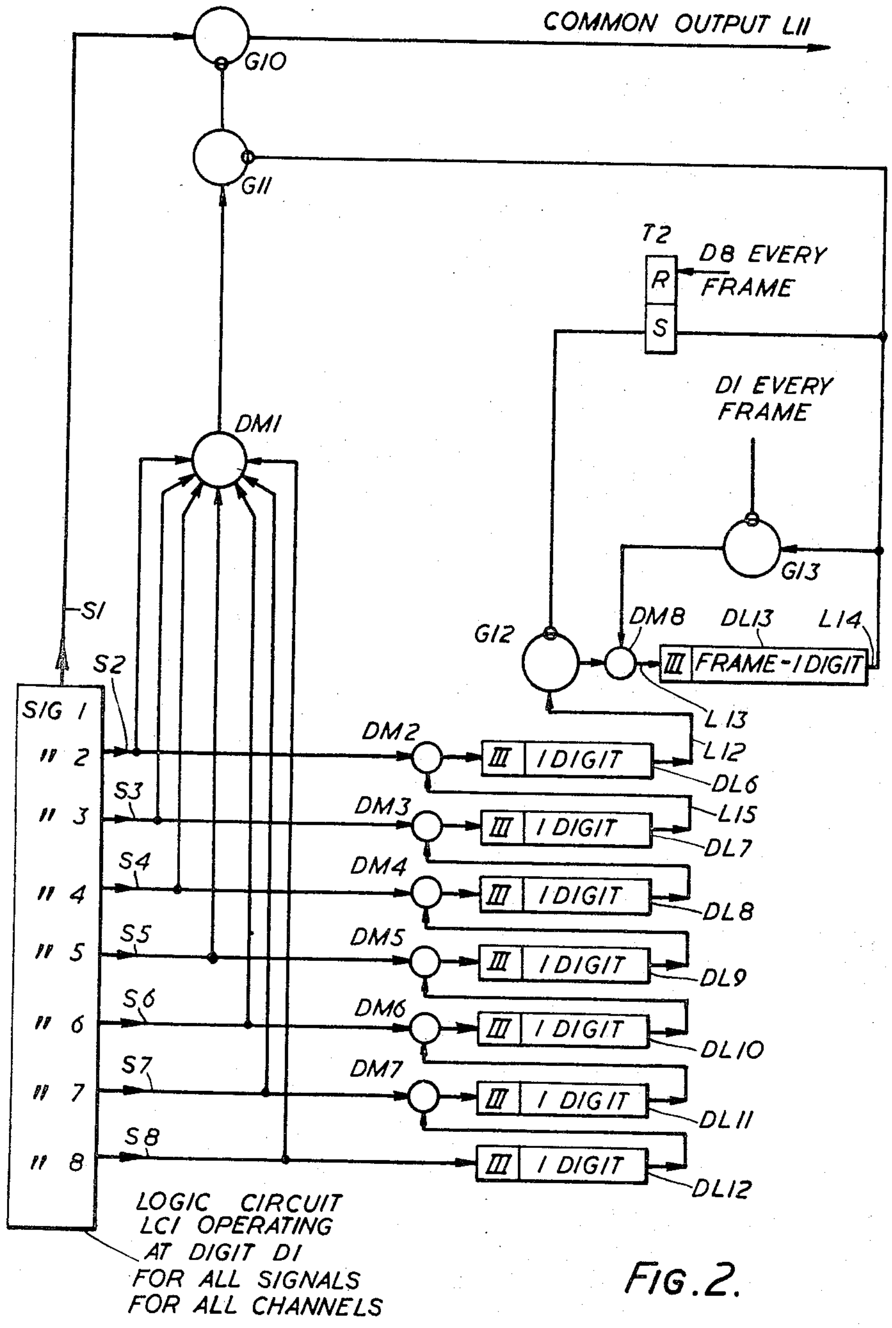
Figure 3:
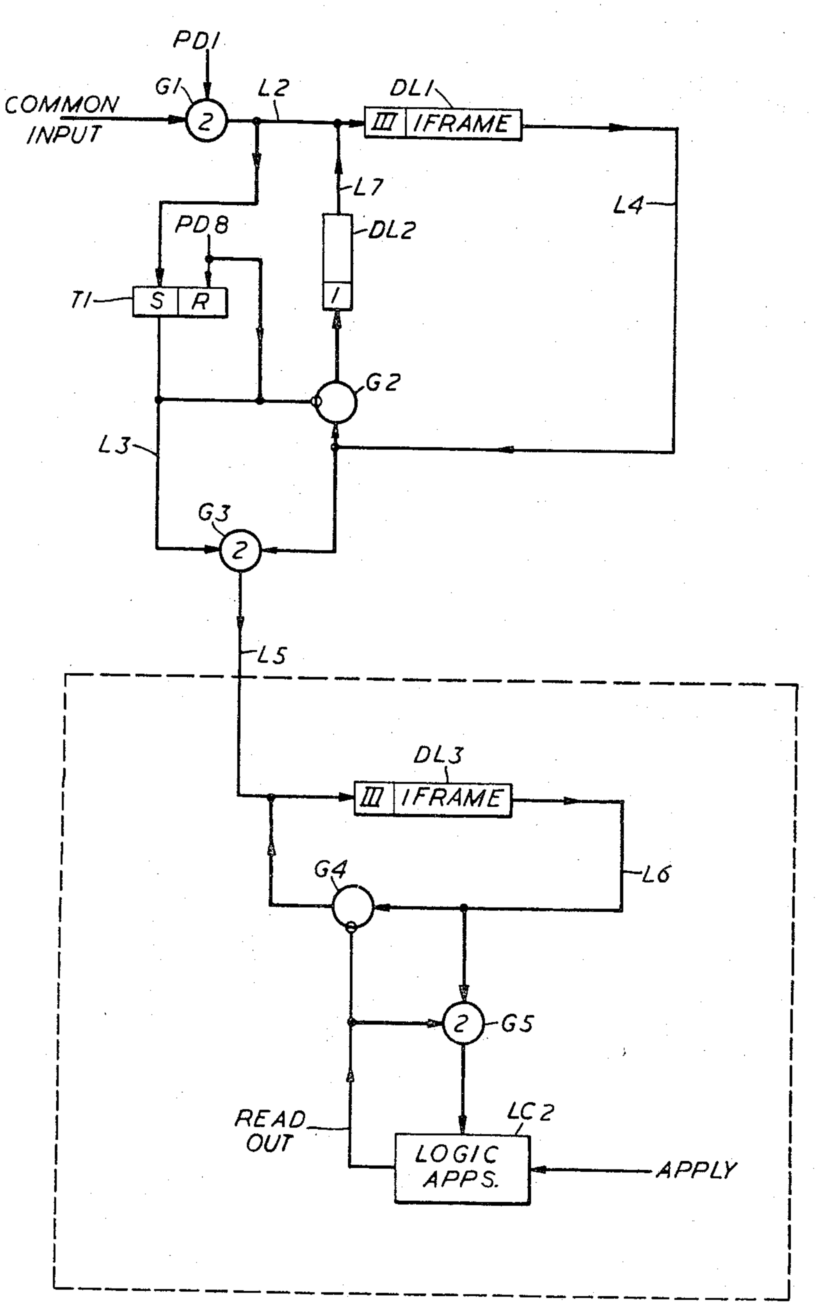
Figure 4:
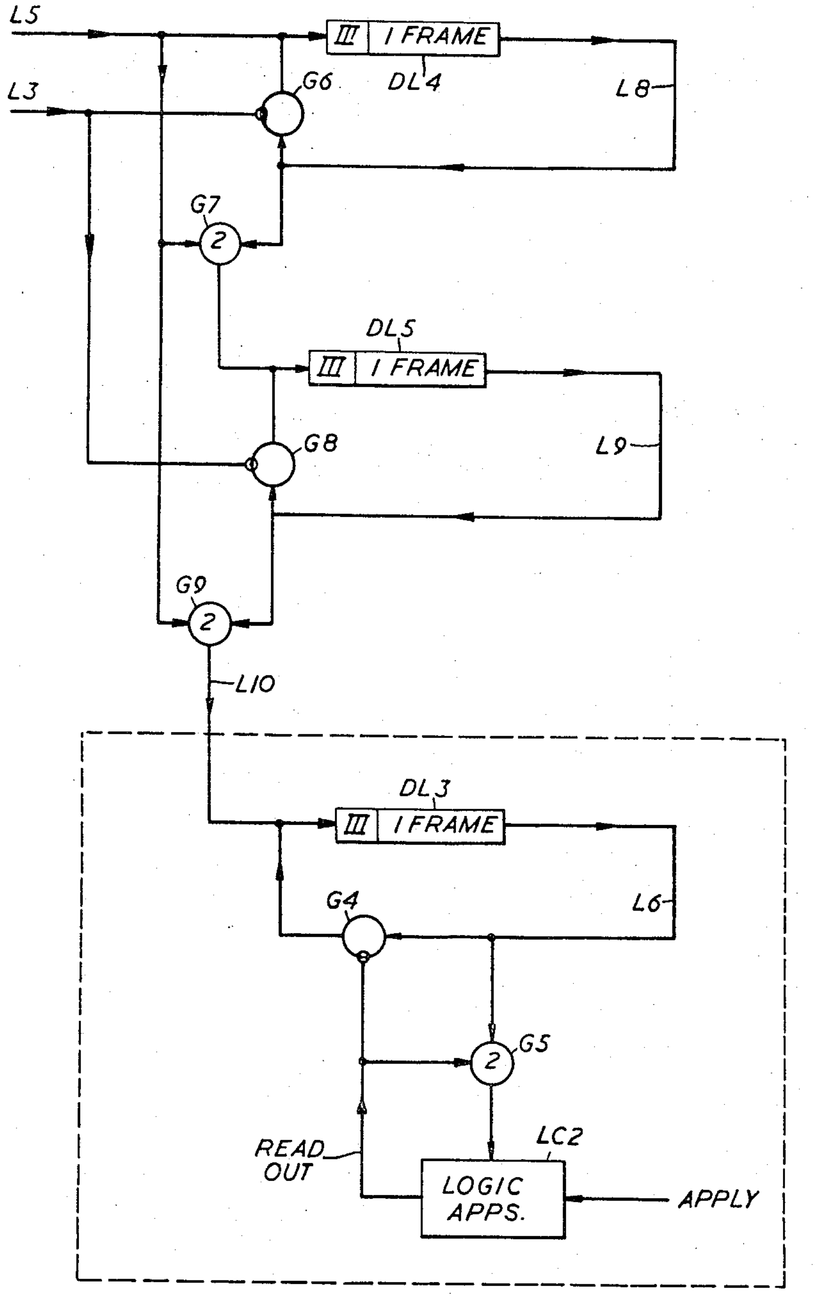
Figure 5:
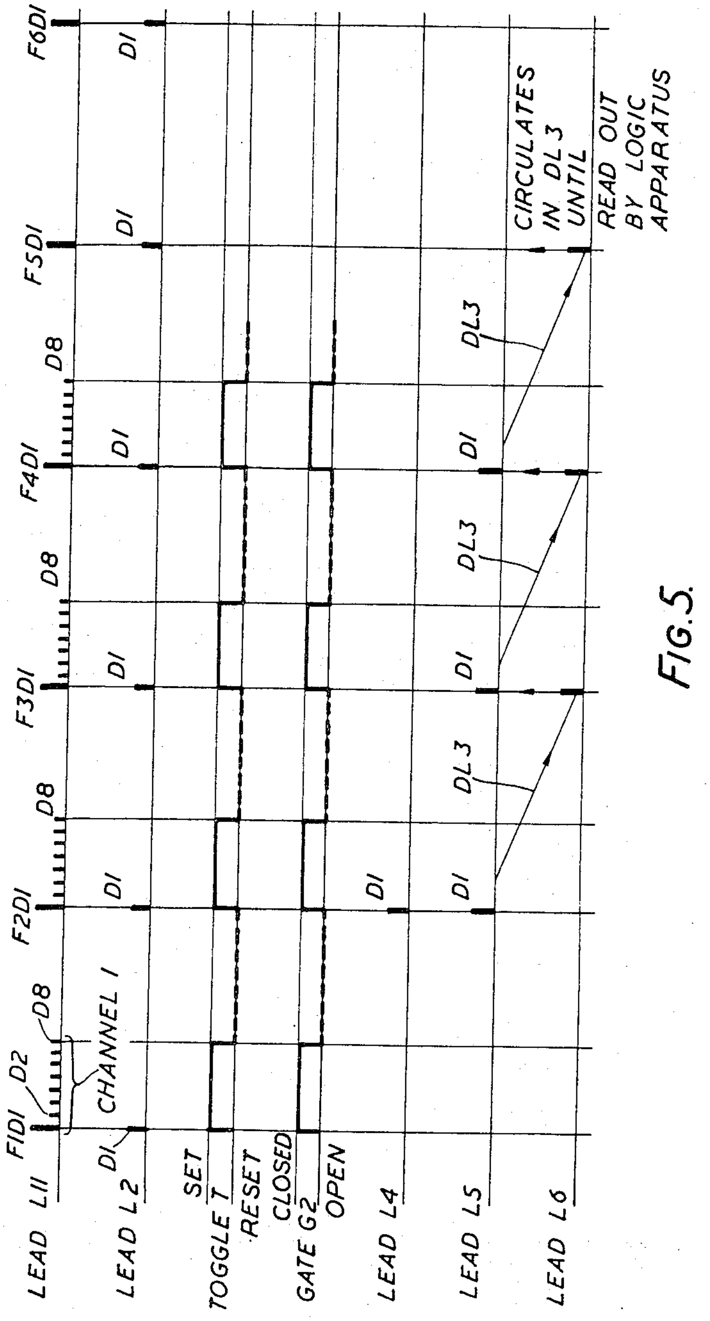
Figure 6:
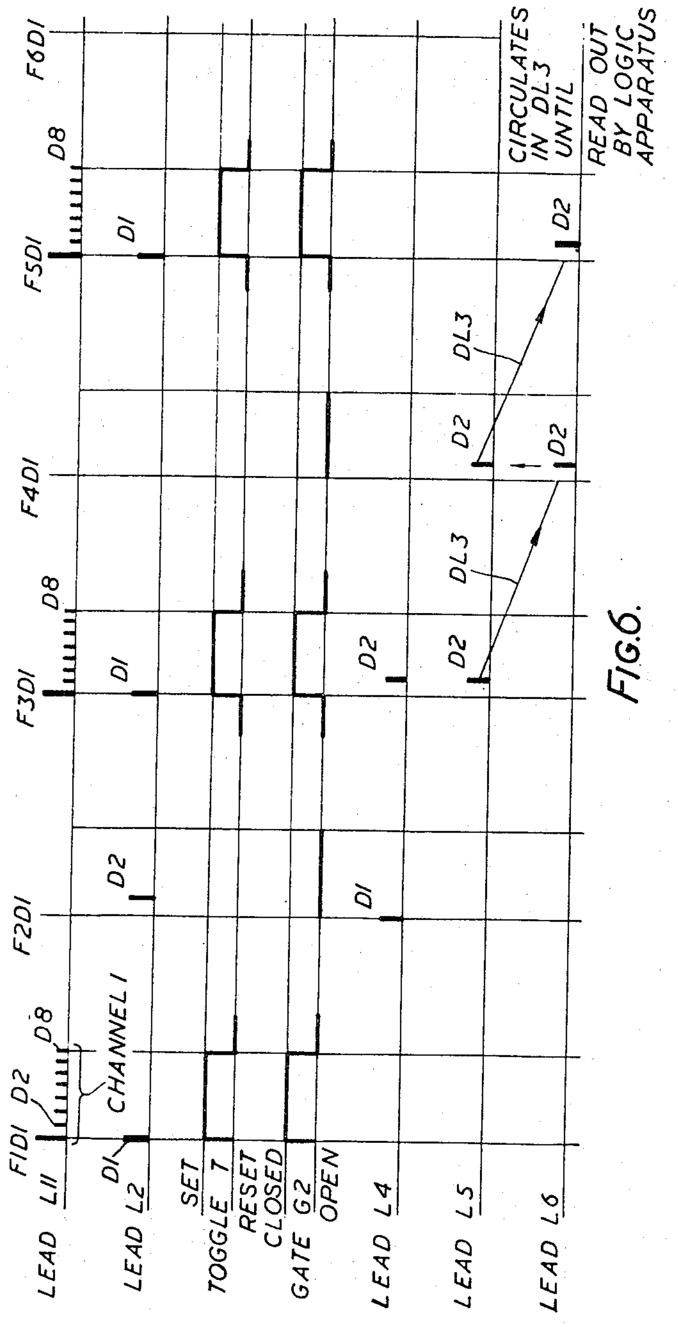

A P.C.M. communication system embodying the invention will now be described in greater detail, with reference to the following drawings, of which:

FIG. 1 shows the forms of different signals that can be transmitted over the system, FIG. 2 is a block schematic of apparatus for transmitting the signals shown in FIG. 1, FIG. 3 is a block schematic of one form of apparatus for receiving signals from one multichannel system, FIG. 4 is a block schematic of another form of apparatus for receiving signals from one multichannel system, FIG. 5 shows for one channel, a time chart of the operation of the apparatus of FIG. 3 for one of the signals of FIG. 1, and, FIG. 6 shows for one channel, a time chart of the operation of the apparatus of FIG. 3 for another of the signals of FIG. 1.

The number of binary code digits per channel and the number of channels per frame can vary in different P.C.M. systems, but this will not affect the operation of the apparatus now to be described except in the matter of timing details relative to gating pulses and length of delay lines. Further, the number of channels per frame need not be stated, as the apparatus deals with the channels cyclically.

For purposes of the following description, it is assumed that there are eight binary digits designated D1 to D8 per channel, and the D1 is reserved for signalling purposes.

In frame 1, the signalling digit of the first channel is designated as F1D1, in frame 2 as F2D1 and so on.

The signals that can be transmitted and received over the system are shown in FIG. 1. The first signal which is the hold signal, takes the form of a pulse in the D1 position in each frame and this continues as long as the channel is in use. Release of the channel is signalled by the removal of the D1 pulse for a specified persistence period, say 300 ms., and this provides the $x^{th}$ signal.

Other signals are obtained by absence of the hold signal for limited periods, the periods being less than the specified period of 300 ms. Thus the 2nd signal is obtained by the absence of the hold signal from alternate frames, i.e. D1 appears in every other frame, the 3rd signal by making D1 appear in every third frame and so on to the 8th signal in which D1 appears in every eighth frame.

Apparatus for transmitting any one or other of the supervisory signals shown in FIG. 1 will now be described with reference to FIG. 2. In that figure, only sufficient details are given for an understanding of the method of transmitting the signals and no apparatus is shown for the transmission of speech signals.

The transmitting apparatus includes a logic circuit LC1 which operates on the D1 digit for all signals for all channels, and in the case of the system described caters for seven other signals apart from the hold and release signals.

As depicted in FIG. 1, the hold signal is termed the first signal, the release signal is termed the ninth signal, the other seven signals being termed signals two to eight.

The logic circuit LC1 has eight output leads S1–8, each lead being common to all the channels, each lead being designated to correspond with a similarly designated signal. In operation, when a channel is seized, the logic circuit LC1 operates to apply the D1 digit at the channel time of every frame to the S1 output lead connected via gate G10 to a common output lead L11 and when the channel is released, the logic circuit LC1 disconnects the D1 digit on the S1 lead for at least the specified persistence period (300 milliseconds) this period being necessary to distinguish from other signals in the event of the channel being re-seized.

In order to send any one of the other seven signals on the seized channel, the logic circuit LC1 applies to the appropriate output lead of the leads S2–8, a D1 digit at the channel time for every frame, coincident with the D1 digit of the channel on output lead S1. The signals are then generated as follows:

In this description the term "first frame" will apply to that frame in which the D1 digit is first applied by the logic circuit LC1 to one of the output leads S2–8 and is numbered F1, and subsequent frames will be numbered in sequence.

*2nd Signal* (D1 digit in every second frame on common output lead L11).—The D1 digit of the first frame, F1D1, is applied by logic circuit LC1 coincidently to leads S1 and S2, F1D1 digit on lead S2 via decoupling means DM1 and gate G11 not inhibited, inhibits gate G10 to the F1D1 digit on lead S1, so that F1D1 does not appear on common output lead L11. The F1D1 digit on lead S2 is also inserted via decoupling means DM2 into delay line DL6 which has a delay time of one digit and from which F1D1 emerges on lead L12 at the time of the D2 digit, i.e. at time F1D2. This F1D2 digit via gate G12 open, and decoupling means DM8, is inserted into delay line DL13 having a delay time of one frame less one digit, so that F1D1 emerges on lead L14 at the time of the D1 digit of the second frame, i.e. at time F2D1. This F2D1 digit on lead L14 inhibits gate G11, to prevent the coincident F2D1 digit on lead S2 from inhibiting gate G10, so that the coincident D1 digit of the second frame, i.e. F2D1 on lead S1 does appear on common output lead L11. F2D1 digit on lead L14 is inhibited in gate G13 to prevent it recirculating in delay line DL13. F2D1 digit on lead L14 also sets the toggle T2 to inhibit gate G12 for remainder of frame, so that the F2D2 digit on lead L12 as a result of the F2D1 digit on lead S2, is not inserted into delay line DL13. Toggle T2 is reset by the F2D8 digit. There is now no stored information and the D1 digit of the third frame, i.e. F3D1 applied by the logic circuit LC1 to output leads S1 and S2 will not appear on common output lead L11 for the reasons described above for the first frame, while the D1 digit of the fourth frame, i.e. F4D1 will appear on common output lead L11 in a manner similar to that described for the second frame, and so on.

*3rd Signal* (D1 digit in every third frame on common output lead L11).—The F1D1 digit is applied by logic circuit coincidently on leads S1 and S3. The F1D1 digit on lead S3 via decoupling means DM1 and gate G11 open, inhibits gate G10 to the F1D1 digit on lead S1, so that the F1D1 digit does not appear on common output lead L11. The F1D1 digit on lead S3 is also inserted via decoupling means DM3 into delay line DL7 which has a delay time of one digit, to appear on output lead L15 as a F1D2 digit, which in turn via decoupling means DM2 is inserted into delay line DL6 to appear on output lead L12 as F1D3 digit, which via gate G12 open, and decoupling means DM8 is inserted into delay line DL13 to appear on output lead L14 as a D2 digit of the second frame, i.e. at time F2D2. This F2D2 digit on lead L14.

(a) Passes via gate G13 open, and decoupling means DM8, and is inserted into delay line DL13 to appear on output lead L14 as a D1 digit in the third frame, i.e. at time F3D1, (b) Sets toggle T2 to inhibit gate G12 for remainder of frame so that the F2D3 digit on lead L12 as a result of the F2D1 digit is not inserted into delay line DL13, (c) Inhibits gate G11 (incidental at this time). The F2D1 digit on lead S3 will therefore inhibit gate G10 to the F2D1 digit on lead S1, so that the F2D1 digit does not appear on common output lead L11.

Toggle T2 is reset by F2D8 digit. As stated in (a) above a F3D1 digit is on output lead L14 of delay line DL13, and this F3D1 digit:

(a) Is inhibited in gate G13 to prevent recirculation in delay line DL13, (b) Sets toggle T2 to inhibit gate G12 for remainder of frame, (c) Inhibits gate G11 to prevent the F3D1 digit on output lead S3 from inhibiting gate G10, so that the coincident F3D1 digit on output lead S1 will appear on common output lead L11.

Toggle T2 reset by F3D8 digit and no information is now stored in delay line DL13 and the fourth frame will start another cycle as for the first frame.

Further signals will now be described in abbreviated form.

*4th Signal* (D1 on L11 every fourth frame):

F1D1 on S1 and S4.
F1D1 on S4 via DM1, G11 open, inhibits G10.
F1D1 on S1 does not appear on L11.
F1D1 on S4, DM4, DL8, DM3, DL7, DM2, DL6 appears on F1D4 on L12.
F1D4 on L12, G12 open, DM8, DL13 appears on lead L14 as F2D3.
F2D3 on L14—
(a) sets T2 to inhibit G12 for remainder of frame,
(b) inhibits G11,
F2D1 on S4, via DM1, G11 open inhibits G10.
F2D1 on S1 does not appear on L11.
(c) via G13 open, DM8, DL13, appears as F3D2 on L14.
T2 reset by F2D8.
F3D2 on L14 from (c)—
(a) sets T2 to inhibit G12 for remainder of frame,
(b) inhibits G11 (incidental).
F3D1 on S4 via DM1, G11 open, inhibits G10.
F3D1 on S1 does not appear on L11.
(c) via G13 open, DM8, DL13, appears as F4D1 on L14.
T2 reset by F3D8.
F4D1 on L14,
(a) sets T2 to inhibit G12 for remainder of frame.
(b) inhibits G11 so that F4D1 on S1 cannot inhibit G10.
F4D1 on S1 will appear on L11.
(c) is inhibited in G13.
T2 reset by F4D8.
DL13 is now empty, and fifth frame will start another cycle as for the first frame.

*5th Signal* (D1 on L11 every fifth frame):

F1D1 on S1 and S5.
F1D1 on S5, DM1, G11 open inhibits G10.
F1D1 on S1 does not appear on L11.
F1D1 on S5, DM5, DL9, DM4, DL8, DM3, DL7, DM2, DL6 appears on L12 as F1D5.
F1D5 on L12, G12 open, DM8, DL13 appears on L14 as F2D4.
F2D4 on L14—
(a) sets T2 to inhibit G12 for remainder of frame.
(b) inhibits G11 (incidental).
F2D1 on S5, DM1, G11 open inhibits G10.
F2D1 on S1, does not appear on L11.
(c) via G13 open, DM8, DL13, appears as F3D3 on L14.
T2 reset by F2D8.
F3D3 on L14—
(a) sets T2 to inhibit G12 for remainder of frame.
(b) inhibits G11 (incidental).
F3D1 on S5 via DM1, G11 open inhibits G10.
F3D1 on S1 does not appear on L11.
(a) via G13 open, DM8, DL13, appears as F4D2 on L14.
T2 reset by F3D8.
F4D2 on L14—
(a) sets T2 to inhibit G12 for remainder of frame.
(b) inhibits G11 (incidental).
F4D1 on S5 via DM1, G11 open inhibits G10.
F4D1 on S1 does not appear on L11.
(c) via G13 open, DM8, DL13, appears as F5D1 on L14.
T2 reset by F4D8.
F5D1 on L14—
(a) sets T2 to inhibit G12 for remainder of frame.
(b) inhibits G11 so that F5D1 on S1 cannot inhibit G10.
F5D1 on S1 appears on L11.
(c) is inhibited in G13.
T2 reset by F5D8.

DC13 is now empty and sixth frame will start another cycle as for first frame.

*6th Signal* (D1 on L11 every sixth frame):

F1D1 on S1 and S6.
F1D1 on S6 via DM1, G11 open, inhibits G10.
F1D1 does not appear on L11.
F1D1 on S6, DM6, DL10, DM5, DL9, DM4, DL8, DM3, DL7, DM2, DL6 appears on L12 as F1D6.
F1D6 on L12, G12 open, DM8, DL13 appears on L14 as F2D5.
F2D5 on L14—
(a) sets T2 to inhibit G12 for remainder of frame.
(b) inhibits G11 (incidental).
F2D1 on S6 via DM1, G11 open inhibits G10.
F2D1 on S1 does not appear on L11.
(c) via G13 open, DM8, DL13, appears as F3D4 on L14.
T2 reset by F2D8.
F3D4 on L14—
(a) sets T2 to inhibit G12 for remainder of frame.
(b) inhibits G11 (incidental).
F3D1 on S6 via DM1, G11 open inhibits G10.
F3D1 on S1 does not appear on L11.
(c) via G13 open, DM8, DL13, appears as F4D3 on L14.
T2 reset by F3D8.
F4D3 on L14—
(a) sets T2 to inhibit G12 for remainder of frame.
(b) inhibits G11 (incidental).
F4D1 on S6 via DM1, G11 open inhibits G10.
F4D1 on S1 does not appear on L11.
(c) via G13 open DM8, DL13, appears at F5D2 on L14.
T2 reset by F4D8.
F5D2 on L14—
(a) sets T2 to inhibit G12 for remainder of frame.
(b) inhibits G11 (incidental).
F1D1 on S6 via DM1, G11 open inhibits G10.
F5D1 on S1 does not appear on L11.
(c) via G13 open, DM8, DL13, appears as F6D1 on L14.
T2 reset by F5D8.
F6D1 on L14—
(a) sets T2 to inhibit G12 for remainder of frame.
(b) inhibits G11 so that F6D1 on S1 cannot inhibit G10.
F6D1 on S1 appears on L11.
(c) is inhibited in G13.
T2 reset by F6D8.
DL13 is now empty and seventh frame will start another cycle as for first frame.

*7th Signal* (D1 on L11 every seventh frame):

F1D1 on S1 and S7.
F1D1 on S7, DM1, G11 open inhibits G10.
F1D1 on S1 does not appear on L11.
F1D1 on S7, DM7, DL11, DM6, DL10, DM5, DL9, DM4, DL8, DM3, DL7, DM2, DL6 appears on L12, as F1D7. D6 on L12, G12 open, DM8, DL13 appears on L14 as F2D6.
F2D6 on L14—
(a) sets T2 to inhibit G12 for remainder of frame.
(b) inhibits G11 (incidental).
F2D1 on S7 via DM1, G11 open inhibits G10.
F2D1 on S1 does not appear on L11.
(c) via G13 open, DM8, DL13 appears as F3D5 on L14.
T2 reset by F2D8.
F3D5 on L14—
(a) sets T2 to inhibit G12 for remainder of frame.
(b) inhibits G11 (incidental).
F3D1 on S7 via DM1, G11 open inhibits G10.
F3D1 on S1 does not appear on L11.
(c) via G13 open, DM8, DL13 appears as F4D4 on L14.

T2 reset by F3D8.

F4D4 on L14—

(a) sets T2 to inhibit G12 for remainder of frame.

(b) inhibits G11 (incidental).

F4D1 on S7 via DM1, G11 open inhibits G10.

F1D1 on S1 does not appear on L11.

(c) via G13 open, DM8, DL13 appears as F5D3 on L14.

T2 reset by F4D8.

F5D3 on L14—

(a) sets T2 to inhibit G12 for remainder of frame.

(b) inhibits G11 (incidental).

F5D1 on S7 via DM1, G11 open inhibits G10.

F5D1 on S1 does not appear on L11.

(c) via G13 open, DM8, DL13 appears as F6D2 on L14.

F6D2 on L14—

(a) sets T2 to inhibit G12 for remainder of frame.

(b) inhibits G11 (incidental).

F6D1 on S7 via DM1, G11 open inhibits G10.

F6D1 on S1 does not appear on L11.

(c) via G13 open, DM8, DL13 appears as F7D1 on L14.

T2 reset by F6D8.

F7D1 on L14—

(a) sets T2 to inhibit G12 for remainder of frame.

(b) inhibits G11 so that F7D1 on S1 cannot inhibit G10.

F7D1 on S1 appears on L11.

(c) is inhibited on G13.

T2 reset by F7D8.

DL13 is now empty and eighth frame will start another cycle as for first frame.

*8th Signal* (D1 on L11 every eighth frame):

F1D1 on S1 and S8.

F1D1 on S7, DM1, G11 open inhibits G10.

F1D1 on S1 does not appear on L11.

F1D1 on S8, DL12, DM7, DL11, DM6, DL10, DM5, DL9, DM4, DL8, DM3, DL7, DM2, DL6 appears on L12 as F1D8.

F1D8 on L12, G12, open, DM8, DL13 appears as F2D7.

F2D7 on L14—

(a) sets T2 to inhibit G12 for remainder of frame.

(b) inhibits G11 (incidental).

F2D1 on S8 via DM1, G11 open inhibits G10.

F2D1 on S1 does not appear on L11.

(c) via G13 open, DM8, DL13 appears as F3D6 on L14.

T2 reset by F2D8.

F3D6 on L14—

(a) sets T2 to inhibit G12 for remainder of frame.

(b) inhibits G11 (incidental).

F3D1 on S8 via DM1, G11 open inhibits G10.

F3D1 on S1 does not appear on L11.

(c) via G13 open, DM8, DL13 appears as F4D5 on L14.

T2 reset by F3D8.

F4D5 on L14—

(a) sets T2 to inhibit G12 for remainder of frame.

(b) inhibits G11 (incidental).

F4D1 on S8 via DM1, G11 open, inhibits G10.

F4D1 on S1 does not appear on L11.

(c) via G13 open, DM8, DL13 appears as F5D4 on L14.

T2 reset by F4D8.

F5D4 on L14—

(a) sets T2 to inhibit G12 for remainder of frame.

(b) inhibits G11 (incidental).

F5D1 on S8 via DM1, G11 open inhibits G10.

F5D1 on S1 does not appear on L11.

(c) via G13 open, DM8, DL13 appears as F6D3 on L14.

T2 reset by F5D8.

F6D3 on L14—

(a) sets T2 to inhibit G12 for remainder of frame.

(b) inhibits G11 (incidental).

F6D1 on S8 via DM1, G11 open inhibits G10.

F6D1 on S1 does not appear on L11.

(c) via G13 open, DM8, DL13 appears as F7D2 on L14.

T2 reset by F6D8.

F7D2 on L14—

(a) sets T2 to inhibit G12 for remainder of frame.

(b) inhibits G11 (incidental).

F7D1 on S8 via DM1, G11 open inhibits G10.

F7D1 on S1 does not appear on L11.

(c) via G13 open, DM8, DL13 appears as F8D1 on L14.

T2 reset by F8D8.

F8D1 on L14—

(a) sets T2 to inhibit G12 for remainder of frame.

(b) inhibits G11 so that D1 of eighth frame F8D1 on S1 appears on L11.

(c) is inhibited in G13.

T2 is reset by F8D8.

DL13 is now empty and ninth frame will start another cycle as for first frame.

In FIG. 3 the multichannel transmission line L11 is connected as an input to AND-gate G1 to which is also connected a pulse train source PD1 whose pulses are coincident with the first digit position in each channel. Thus AND-gate G1 seeks coincidence with the D1 digit of each channel in turn, and each time a D1 digit is present in a channel, it appears on the output lead L2 of AND-gate G1 and is applied as an operate stimulus to toggle T1 and also to delay line DL1.

Taking for example, one particular channel say $C_x$, pulse D1 is present when this channel is presented to AND-gate G1, pulse D1 on output lead L2 sets toggle T1 and is also inserted into delay line DL1 which has a delay time equal to the time of one frame of the multichannel line. The output of toggle T1 on lead L3 inhibits gate G2. Connected to the reset input of toggle T1 is a pulse PD8 coincident with each D8 binary code digit position in each channel. The toggle T1 having been set by digit D1 will be reset by digit D8 of the same channel and will therefore be prepared to be set again if the D1 digit of the next channel is present.

If channel $C_x$ is giving a hold signal, this will mean that the D1 digit is appearing in that channel in every frame, say for example, that AND-gate G1 detects the D1 digit in frame 1 i.e. the F1D1 digit, this will set toggle T1 and be inserted into delay line DL1 which has a delay of one frame. At the time of the D8 digit, i.e. F1D8, toggle T1 will be reset by the pulse PD8 and gate G2 will be inhibited. On receipt by AND-gate G1 of the D1 digit of the next frame, i.e. digit F2D1, toggle T1 will be set again and in turn inhibit gate G2. The F1D1 digit, having been delayed by one frame in delay line DL1, appears on the output L4 of this delay line at the time of digit F2D1, and is prevented from recirculating because gate G2 is inhibited. The output L3 of toggle T1 and the output L4 of delay line DL1 both at the time of digit F2D1 find coincidence in AND-gate G3, and digit F2D1 is inserted into delay line DL3 which also has a delay time equal to one frame. Digit F2D1 will recirculate via gate G4 until such time as it is required to be read-out. This is done by means of logic apparatus LC2, which is not described herein as it consists of well known techniques. When it is required to examine the signalling condition of the channel, applicataion is made to the logic apparatus LC2 which for the time of the channel inhibits gate G4 to stop recirculation in delay line DL1, and opens AND-gate G5 so that the output of delay line DL3 is presented to the logic apparatus LC2 for examination.

Now consider the case where a channel is giving a signal different from the hold signal, say the 4th signal as depicted in FIG. 1, in which the D1 digit appears only in each fourth frame, i.e. in position F1D1, F5D1, F9D1 etc.

Assume as before that the first D1 digit detected is F1D1, the procedure is as already described, in that it is inserted into delay line DL1 and sets toggle T1, which in turn is reset at the time of digit F1D8. Digit F1D1 will appear on the output L4 of delay line DL1, in the time of digit F2D1 and will pass through gate G2, which is not inhibited since no F2D1 digit is detected by gate G1, and be inserted into delay line DL2 which has a delay equal to one digit period. It therefore appears as digit F2D2 on the output of delay line DL2 and is inserted back into delay line DL1 at the time of digit D2. This recirculation will continue as long as AND-gate G1 fails to detect a D1 digit, the digit on the output L4 of delay line DL1 being advanced by one digit before being reinserted. As soon as AND-gate G1 detects another D1 digit, in this example, it will be in position F5D1, toggle T1 will be set to inhibit gate G2 and open AND-gate G3. Because in this example, AND-gate G1 did not detect a digit in frames 2, 3 and 4, the original digit F1D1 inserted into delay line DL1 will have recirculated three times and will therefore now emerge from the delay line in position F5D4. This time it will not recirculate because gate G2 is inhibited by the output L3 of toggle T1, but AND-gate G3 is open and digit F5D4 is inserted into delay line DL3, in which it will circulate dependent on the condition of gate G4.

When operated, the logic apparatus LC2 closes gate G4 and opens AND-gate G5 each time for the duration of a channel, so that it can examine all of the eight digit positions in which a signal may appear, the actual digit position characterising the particular signal. In the example already described the logic apparatus LC2 will receive from delay line DL3 a digit in position D4 denoting the 4th signal as shown in FIG. 1.

Similarly the other signals are depicted in accordance with the number of adjacent frame interruptions of the D1 digit, so that for sample the 8th signal which has seven interruptions as shown in FIG. 1 will be detected by the logic appartus LC2 as a digit circulating in delay line DL3 in the D8 position.

If more than seven adjacent interruptions occur as in the releases signal, then at D8 time gate G2 is closed to prevent further circulation and as toggle T1 is still reset, AND-gate G3 is still closed, and the D8 digit on the output L4 of delay line DL1 will not be inserted into delay line DL3. When the logic apparatus LC2 fails to detect a digit for a given time (i.e. say 300 ms.) it will initiate release of the channel connection.

The possibility exists of false signals being created by unwanted interruptions of the circuit and also by false digits splitting a long interruption into shorter ones. In order to avoid unwanted logical functions occurring as a result of these signal mutilations, it is possible to make the passing of a signal to the logic apparatus LC2, be dependent upon the same signal having been received several times in sequence.

A block diagram of the additional apparatus for achieving this is shown in FIG. 4. That part of the diagram enclosed within the dotted lines, consisting of delay line DL3, gates G4 and G5 logic apparatus LC2 is the same as is shown in FIG. 3, within the dotted rectangle.

As already described relative to FIG. 3, the receipt of the 4th signal as shown in FIG. 1 in which a D1 digit is received only every fourth frame, results in a D4 digit being presented on the output L5 of AND-gate G3 in FIG. 3. The output L5 of AND-gate G3, is in FIG. 4 connected as the input to delay line DL4 which has a delay period equal to one frame.

As long as the signal information persists, a D4 digit should appear on output lead L5 every fourth frame. The first D4 digit inserted into delay line DL4 will circulate via gate G6 provided this gate is not inhibited by lead L3 which is the output of toggle T1 in FIG. 3. Under normal conditions this lead L3 should inhibit only every fourth frame coincident with the D4 digit on lead L5, and under this condition gate G6 will be inhibited to prevent recirculation of the D4 digit stored in delayed line DL4, which will, however, on output lead L8 find coincident in AND-gate G7 with the D4 digit on lead L5. Thus the D4 digit on lead L8 will be inserted into delay line DL5, having a delay equal to one frame, while the D4 digit on lead L5 is inserted into delay line DL4. Circulation in delay line DL4 via gate G6, and in delay line DL5 via gate G8 will continue until another D4 digit is received on lead L5, when the toggle T1 output lead L3 will inhibit both of these gates. As before the D4 digit on the output lead L8 of delay line DL4 will be inserted via AND-gate G7 into delay line DL5 and in addition the D4 digit on the output lead L9 will be inserted via AND-gate G9 and lead L10 into delay line DL3 where it will be stored and accessible for the logic apparatus as already described above relative to FIG. 3.

In this case it was necessary for three adjacent D4 digits to be received before the signal condition was made accessible to the logic apparatus LC2, but it will be obvious that it can be made dependent on any given number of adjacent digits, by providing a suitable number of stages of delay line circulating systems, such as DL4 and DL5.

In the embodiment described it was assumed that each channel contained 8 binary digits, the first digit D1 being used for signalling and the remaining seven D2–8 for sampling speech. Thus in FIG. 3 AND–gate G1 is gated by a pulse coincident with D1, and toggle T1 is reset by a pulse coincident with D8. As shown in FIG. 1 this arrangement allows up to nine different signals, the first eight being detected by the logic apparatus LC2 as pulses in delay line DL3 of FIG. 3 in positions coincident with digits D1 to D8, while the ninth signal, representing release of the connection is detected as no pulse for a specified period.

The arrangement already described is the preferred method, provided the number of different signals required, apart from the release signal, does not exceed the number of binary digits employed per channel in the multichannel system.

If the number of signals required does exceed this number however, then certain timing modifications are necessary in the apparatus shown in FIG. 3. For example, if instead of 8 signals and the release, there are 10 signals, they will appear in delay line DL3 in a 10-digit cycle within one channel time, that will not be coincident with the 8-digit binary code cycle of each channel of the system.

This means that in FIG. 3 delay line DL2 must have a time delay equal to one digit of the 10-digit cycle, and toggle T1 must be reset by a pulse coincident with digit D10 of that cycle.

FIGS. 5 and 6 show respectively, the time chart of the operation for the first and second signals relative to the apparatus shown in FIG. 3.

I claim:

1. A multichannel pulse code modulation communication system in which one digit position of each channel is allocated for the transmission of signalling information relating to the channel comprising in combination a pulse transmitter, a control unit for said transmitter, a plurality of control leads from said control unit, different combinations of said leads each representing a different type of signalling information, a pulse train source the pulses of which are coincident with said digit position, means for applying said pulse to that combination of said leads representing the signalling information to be transmitted and for suppressing the transmission of pulses of the pulse train other than those separated by a time interval characterising the signalling information to be transmitted, and receiving means for receiving said pulses in said signalling digit position.

2. A system as claimed in claim 1 and further comprising a common output lead, a transmission control circuit interconnecting one of said control leads with said common output lead, a pulse storage system to which said control leads with the exception of said one control lead are connected, as input leads, an output lead interconnecting said pulse storage system to said transmission control circuit for controlling the latter to inhibit the transmission of pulses other than those separated by said characteristic time interval.

3. A system as claimed in claim 1 and further comprising a common output lead, a first transmission control circuit interconnecting one of said control leads with said common output lead, a first pulse storage system having a plurality of input points separated by sections of said system of equal time storage, connections from each of said input points to a different one of the remainder of said control leads, a second pulse storage system connected to receive the output of said first storage system via a second transmission control circuit, a recirculating path for said further storage system for preventing the recirculation of selected stored pulses, a third transmission control circuit connecting each of said remainder of said control leads to said first transmission control circuit to control the conductivity thereof, an output lead from said second pulse storage system joined to said third transmission path to control the conductivity thereof and via a toggle device to said second transmission control circuit to control the conductivity thereof.

4. A system as claimed in claim 1 and further comprising a common output lead, a first transmission control circuit interconnecting one of said control leads with said common output lead, a first pulse storage system having a plurality of input points separated by sections of said system of equal time storage, connections from each of said input points to a different one of the remainder of said control leads, a second pulse storage system connected to receive the output of said first storage system via a second transmission control circuit, a recirculating path for said further storage system for preventing the recirculation of selected stored pulses, a third transmission control circuit connecting each of said remainder of said control leads to said first transmission control circuit to control the conductivity thereof, an output lead from said second pulse storage system joined to said third transmission path to control the conductivity thereof and via a toggle device to said second transmission control circuit to control the conductivity thereof, a third pulse storage system connected to said common output lead via a pulse gating circuit for gating into said third storage system pulses in said allotted digit position, a recirculation path connected across said third storage system for continuing storage of said gated pulses for a time interval equal to said determined time interval and for then producing an output and deleting said gated pulses from said third storage system.

5. A multichannel pulse code modulation communication system comprising in combination, means for allotting one digit position of each channel for the transmission of signalling information relating to the channel, means for determining the time interval between one appearance of a pulse in the one digit position and the next appearance of a pulse in said digit position in accordance with signalling information to be transmitted and for transmitting pulses in said digit positions at said determined time intervals, a receiver for receiving said transmitted pulses, a transmission control circuit in said receiver, a pulse storage system connected to said transmission control circuit for admitting to said storage system only pulses in said allotted digit position, a recirculation path connected across said pulse storage system for continuing storage of said admitted pulses for a time interval equal to said determined time interval and for then producing an output.

6. A system as claimed in claim 5 and further comprising a further pulse storage system for receiving and storing the said output, and a read-out control circuit connected to said further pulse storage system for obtaining access to said stored output and deleting the latter from said further pulse storage system.

7. A multichannel pulse code modulation communication system comprising in combination, means for allotting one digit position of each channel for the transmission of signalling information relating to the channel, means for determining the time interval between one appearance of a pulse in the one digit position and the next appearance of a pulse in said digit position in accordance with signalling information to be transmitted and for transmitting pulses in said digit positions at said determined time intervals, a receiver for receiving said transmitted pulses, a transmission control circuit in said receiver, a pulse storage system connected to said transmission control circuit for admitting to said storage system only pulses in said allotted digit position, a recirculation path connected across said pulse storage system for continuing storage of said admitted pulses for a time interval equal to said determined time interval, and for then producing an output pulse in said allotted digit position, a pulse counting circuit connected to receive each said output pulse for counting a preset number of said output pulses and indicating when said count has been made.

8. A system as claimed in claim 7 and further comprising an additional pulse storage system for receiving and storing said indications, and a read-out control circuit connected to said additional pulse storage system for obtaining access to said stored indications and deleting the latter from said additional storage system.

References Cited

UNITED STATES PATENTS

| | | | |
|---|---|---|---|
| 3,083,267 | 3/1963 | Weller | 179—15 |
| 3,166,734 | 1/1965 | Helfrich | 179—155 |

OTHER REFERENCES

Purton, "Experimental 24-Channel P.C.M. System for Junction Circuits," A.T.E. Journal, vol. 20, Number 1, January 1964, pp. 17 and 24 relied on.

JOHN W. CALDWELL, *Acting Primary Examiner.*

ROBERT L. GRIFFIN, *Examiner.*